March 25, 1969 L. C. MILLER 3,435,352
NO-SCAN DETECTOR
Filed April 18, 1966

INVENTOR
LEO C. MILLER
BY
ATTORNEY
AGENT

United States Patent Office 3,435,352
Patented Mar. 25, 1969

3,435,352
NO-SCAN DETECTOR
Leo C. Miller, Silver Spring, Md., assignor to the United States of America as represented by the Secretary of the Navy
Filed Apr. 18, 1966, Ser. No. 544,355
Int. Cl. H03k *5/18*
U.S. Cl. 328—120 10 Claims

The present invention relates generally to a detector for monitoring a memory system and more in particular a non-scan detector for checking the output data of a continuous memory system for determining the non-existence of output data for a specified period of time.

An object of the present invention is to provide a detecting circuit for establishing a restart pulse for a memory system where there is no digital data output for a predetermined period of time.

Another object of the present invention is to provide a monitoring circuit for initiating the restarting ing of scanning circuits of a memory system upon the failure of the memory system to exhibit any output data.

A further object of the present invention is to provide a detecting circuit which operates in the absence of digital data from a ferrite core matrix of a memory system due to a temporary failure thereof.

An additional object of the present invention is to provide a detecting circuit for determining a specified time interval for the absence of digital data and the redetermination of the specified time interval in the presence of digital data.

Other objects, advantages and novel features of the invention will become apparent from the following detailed description of the invention when considered in conjunction with the accompanying drawings wherein.

Figure 1:
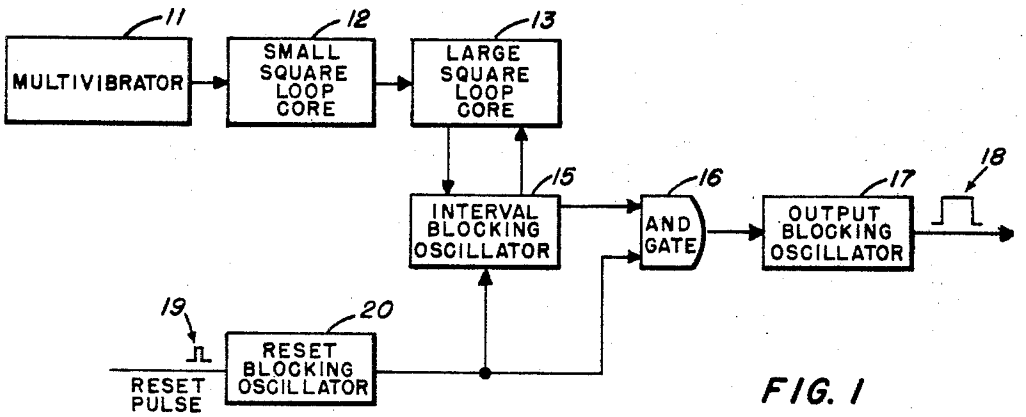
FIG. 1 is a block diagram of the no-scan detector of the present invention.

Referring to FIG. 1, the no-scan detector or monitoring circuit has a self-clocked multivibrator 11 as a timing oscillator for establishing a periodic pulse signal. The multivibrator is coupled to a small square loop core 12 which is switched by the output periodic pulse of the multivibrator. The output of the small square loop core 12 is directly coupled to a large square loop core 13 which upon saturation triggers an interval blocking oscillator 15. The interval blocking oscillator 15 is connected to an AND gate 16 through which the output of the interval blocking oscillator 15 is applied to the ouput blocking oscillator 17 creating a restart pulse 18. If a reset pulse 19 or a digital ONE is received at the reset blocking oscillator 20, a reset trigger pulse developed by the reset blocking oscillator is applied to the interval blocking oscillator 15 which fires this oscillator causing at the same time the resetting of the large square loop core 13. The same reset trigger pulse from reset blocking oscillator 20 is applied to the AND gate 16 which inhibits the output from the interval blocking oscillator 15 from being transferred to the output blocking oscillator 17.

Figure 2:
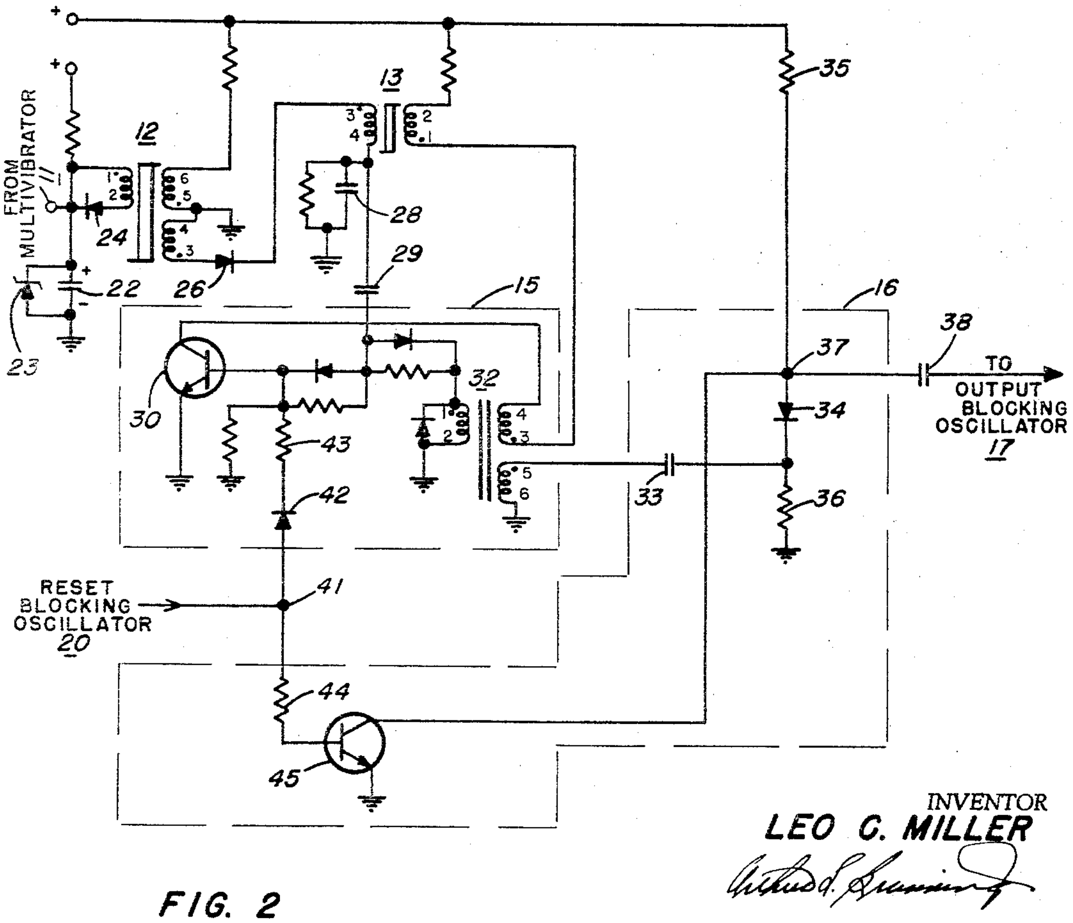
FIG. 2 is a partial electrical schematic diagram of FIG. 1.

By reference to FIG. 2, the operation of the no-scan detector is as follows. The multivibrator 11 is self clocked operating at approximately 1.2 seconds per cycle. In the absence of the multivibrator pulse, capacitor 22 is charged to a particular positive voltage which is maintained by Zener diode 23. Upon reception of each periodic pulse or the grounding of the cathode of diode 24, the charge on capacitor 22 is pulled through the primary of a small loop core 12 which completely switches the magnetic flux of the small loop core. Upon the application of this positive pulse to the dot terminal of the primary of small square loop core 12, the magnetic flux of core 12 is switched completely since this pulse is stronger than the direct current in the secondary core 12 from pins 6 to 5. After the pulse applied to the dot terminal is over, the small direct current through secondary of core 12 from pins 6 to 5 slowly switches flux of the core 12 in the other direction. Thus, on each periodic pulse from the multivibrator 11, the small square loop core 12 is completely switched.

Upon the switching of small square loop core 12, a small energy pulse from pin 3 to core 12 is transferred to large square loop core 13. The small square loop core 12 is completely switched each time the multivibrator 11 grounds diode 24. As a consequence, the small square loop transformer feeds timed small energy pulses or low voltage signals through diode 26 into a large square loop core 13 to incrementally saturate or set core 13. Approximately 250 to 300 pulses from transformer 12 are necessary to saturate large square loop core 13.

By this arrangement there is partial flux switching of the large core by a smaller core driven by the controlled multivibrator. If the large core were driven directly by the multivibrator, there would be a large variation in the integrated switching time due to the variation in the number of flux steps to saturation of a large core of the same type. By selecting a particular multivibrator rate to trigger the small core the overall time for loading the large core is approximately the same for all detectors independent from the large square loop core being used.

Upon saturation of transformer 13, capacitor 28 is charged to a partiuular voltage level. The voltage on capacitor 28 is applied through coupling capacitor 29 to the base of transistor 30 of the blocking oscillator 15. The application of a positive voltage to the base of the transistor activates the transistor 30 which causes a large current to flow through the secondary of transformer 32 and the secondary of core 13. The effect of this current flow is to apply a negative pulse to pin 1 of large square loop core 13 which switches completely the magnetic flux of core 13 to the other direction which allows transformer 13 to be ready to be charged again to saturation.

Upon the firing of interval blocking oscillator 15 by the conduction of transistor 30, a positive pulse is applied to pin 3 of transformer 32 which induces a positive triggering pulse from pin 5 out of the secondary transformer 32. This triggering pulse from the interval blocking oscillator to pin 5 of transformer 32 is transferred through capacitor 33 to a cathode of diode 34. Normally there is current flowing through diode 34 from a positive voltage source in the voltage divider of resistor 35, diode 34 and resistor 36. Upon the application of a positive pulse to the cathode of diode 34, diode 34 is back biased shutting off any current flow through diode 34. As a consequence less current flows through a resistor 35 and the voltage at junction point 37 is raised in potential which change in voltage is transferred through coupling capacitor 38 to trigger the output blocking oscillator 17.

The application of a "reset" pulse 19 or a ONE from the output of a continuous memory matrix to the reset blocking oscillator activates the oscillator. A reset trigger pulse is developed by the reset blocking oscillator at junction 41 which is applied to the interval blocking oscillator 15 and the AND gate 16. The reset trigger pulse is applied to the base of transistor 30 through diode 42 and resistor 43 to fire the blocking oscillator 15 which in turn resets the transformer 13. At the same time, the reset trigger pulse is applied through resistor 44 to the base of transistor 45 which places transistor 45 into conduction. The conduction of transistor 45 drives the capacitor 38 negative and prevents the transfer of any leading edge of the triggering pulse at pin 5 of transformer 32 on the firing of interval blocking oscillator 15 which inhibits the activation of the output blocking oscillator 17.

Normally the firing of the interval blocking oscillator 15 by the saturation of square loop core 13 takes approximately five and one-half minutes for complete operation providing no reset pulse is applied to the reset blocking oscillator 20. However, in normal operation of a memory system the reset pulse or digital ONE bit occurs at least once during every two minute intervals so that the output blocking oscillator 17 is not activated.

If, however, there is a transient condition in the memory system which causes the lack of scanning of the memory matrix or prevents digital output data from the memory matrix, then no reset pulse would occur and the no-scan detector would fire in approximately five and one-half minutes. The operation of the detector would produce a restart or output pulse from blocking oscillator 17 which is applied to the memory system causing the system to restart the scanning of the memory matrix.

What is claimed is:

1. A no-scan detector for monitoring a continuous memory system having a digital memory matrix comprising:
   interval counting means for establishing a specified interval of time for monitoring a digital memory matrix for output digital data, said interval counting means after the duration of the specified interval of time establishing a triggering pulse for activating a restart pulse for initiating the rescanning of the memory matrix of a continuous memory system;
   reset means connected to said interval counting means receiving digital data from a memory matrix, said reset means being actuated by a positive bit of said digital data establishing a reset trigger pulse for resetting said interval counting means to begin again said specified interval of time and inhibiting said triggering pulse of said interval counting means preventing the activating of a restart pulse.

2. A no-scan detector of claim 1 comprising:
   timing means connected to said interval counting means for actuating said interval counting means.

3. A no-scan detector of claim 2 comprising:
   output pulse producing means for creating a restart pulse connected to said reset means for receiving a triggering pulse from said interval counting means through said reset means in the absence of digital data to said reset means during said specified interval of time.

4. A no-scan detector of claim 1 wherein said interval counting means comprises in combination:
   energy transferring means for supplying timed pulses of energy of a first magnitude;
   energy storage means connected to said energy transferring means receiving said first magnitude pulses of energy for incrementally storing said first magnitude pulses to a second magnitude of energy establishing said specified interval of time;
   interval triggering means connected to said energy storage means being actuated by said energy storage means on reaching said second magnitude of energy creating said triggering pulse after said specified interval of time.

5. A no-scan detector of claim 4 comprising:
   timing means connected to said energy transferring means for furnishing periodic pulses to said energy transferring means causing switching of said energy transferring means for supplying timed pulses of energy of a first magnitude.

6. A no-scan detector of claim 5 comprising:
   output pulse producing means connected to said reset means, said reset means being connected to said interval triggering means of said interval counting means, said output pulse producing means for creating a restart pulse upon receiving a triggering means through said reset means in the absence of digital data to said reset means during said specified interval of time.

7. A no-scan detector of claim 1 wherein said reset means comprises:
   a reset blocking oscillator means and gating means, said reset blocking oscillator means connected to said interval counting means and said gating means, said interval counting means connected to said gating means, said reset blocking oscillator means being actuated by a positive bit of said digital data establishing a reset trigger pulse for resetting said interval counting means and actuating said gating means to inhibit said triggering pulse of said interval counting means.

8. A no-scan detector of claim 1 wherein said interval counting means comprises in combination:
   first square loop core means for supplying timed pulses of energy of a first magnitude;
   second square loop core means connected to said first square loop core means receiving said first magnitude pulses of energy for incrementally storing said first magnitude pulses to a second magnitude of energy establishing said specific interval of time;
   interval blocking oscillator means connected to said second square loop core means being actuated by said second square loop core means on reaching said second magnitude of energy creating said triggering pulse after after said specified interval of time for activating a restart pulse and for resetting said second square loop core means, and wherein said reset means comprises:
   reset blocking oscillator means and gating means, said reset blocking oscillator means connected to said interval blocking oscillator means and said gating means, said interval blocking oscillator means connected to said gating means, said reset blocking oscillator means being actuated by a positive bit of said digital data establishing a reset trigger pulse for actuating said interval blocking oscillator means and actuating said gating means to inhibit said triggering pulse of said interval blocking oscillator means preventing the activating of a restart pulse.

9. A no-scan detector of claim 8 comprising:
   self-clocked multivibrator means connected to said first square loop core means for furnishing periodic pulses to said first square loop core means causing switching of said square loop core means for supplying timed pulses of energy of a first magnitude to said second square loop core means.

10. A no-scan detector of claim 9 comprising:
   output blocking oscillator means connected to said gating means, said output blocking oscillator means creating a restart pulse upon receiving a triggering pulse from said interval blocking oscillator means through said gating means in the absence of digital data to said reset blocking oscillator means during said specified interval of time.

References Cited

UNITED STATES PATENTS 3,139,539 6/1964 Hewett ............ 307—235

ARTHUR GAUSS, *Primary Examiner.*

B. P. DAVIS, *Assistant Examiner.*